United States Patent [19]

Heng et al.

[11] Patent Number: 4,755,018
[45] Date of Patent: Jul. 5, 1988

[54] CONNECTOR FOR OPTICAL FIBERS

[75] Inventors: Jean-Paul Heng, Lyon; Alain Humbert-Labeaumaz, Bron; Marcel Jusseau, Villeurbanne, all of France

[73] Assignee: Cgee Alsthom, Levallois-Perret, France

[21] Appl. No.: 6,202

[22] Filed: Jan. 23, 1987

[30] Foreign Application Priority Data

Jan. 23, 1986 [FR] France .................. 86 00956

[51] Int. Cl.⁴ .................................. G02B 6/38
[52] U.S. Cl. ........................ 350/96.21; 350/96.20
[58] Field of Search ............... 350/96.20, 96.21, 96.22

[56] References Cited

U.S. PATENT DOCUMENTS

| | | | |
|---|---|---|---|
| 4,029,390 | 6/1977 | Chinnock et al. | 350/96.21 X |
| 4,135,782 | 1/1979 | Beauhaire | 350/96.21 |
| 4,225,214 | 9/1980 | Hodge et al. | 350/96.21 |
| 4,247,163 | 1/1981 | Lumpp et al. | 350/96.21 |
| 4,254,865 | 3/1981 | Pacey et al. | 350/96.21 X |
| 4,395,089 | 7/1983 | McKee | 350/96.20 |
| 4,593,972 | 6/1986 | Gibson | 350/96.21 |
| 4,712,864 | 12/1987 | Ellis et al. | 350/96.21 X |

FOREIGN PATENT DOCUMENTS

| | | | |
|---|---|---|---|
| 52-32340 | 3/1977 | Japan | 350/96.21 |
| 58-4111 | 1/1983 | Japan | 350/96.20 X |
| 60-144707 | 7/1985 | Japan | 350/96.20 |
| 2007867 | 5/1979 | United Kingdom | 350/96.20 |

Primary Examiner—William L. Sikes
Assistant Examiner—Brian M. Healy
Attorney, Agent, or Firm—Sughrue, Mion, Zinn, Macpeak & Seas

[57] ABSTRACT

A connector for optical fibers, the connector comprising two complementary portions (1A, 1B) each including at least one semi-tubular extension suitable for forming a split tube with the corresponding semi-tubular extension on the other complementary portion with which it is assembled. Said tube carries an external locking ring (3) which surrounds the tube and which, when suitably positioned, serves to urge the semitubular extensions towards each other, thereby enabling at least one optical fiber inserted into the tube to be clamped in place. Said extensions thicken towards one of the ends of the tube which they form, and said locking ring and at least one of the extensions include respective complementary members constituted by at least one longitudinal groove and at least one longitudinal radial rib, thereby enabling the two extensions of the tube to be urged towards each other for clamping an optical fiber by displacing said locking ring towards the end of the tube where the extensions are thicker while said rib is received in said groove, and then by rotating the locking ring about the tube, thereby dislodging the rib from the groove and compressing the rib.

9 Claims, 2 Drawing Sheets

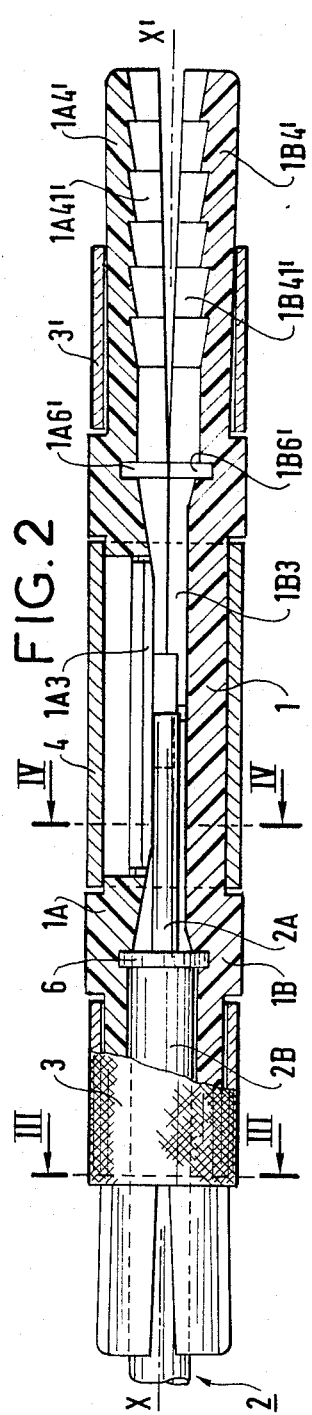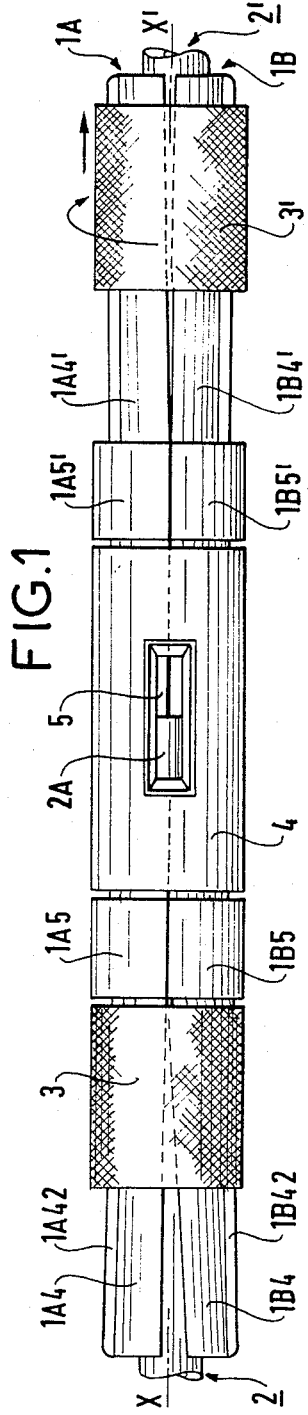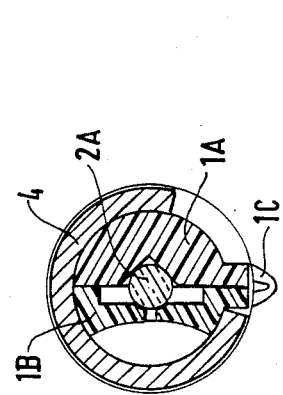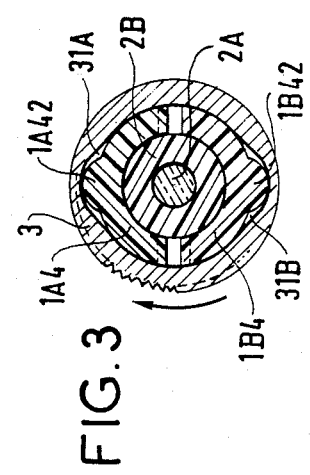

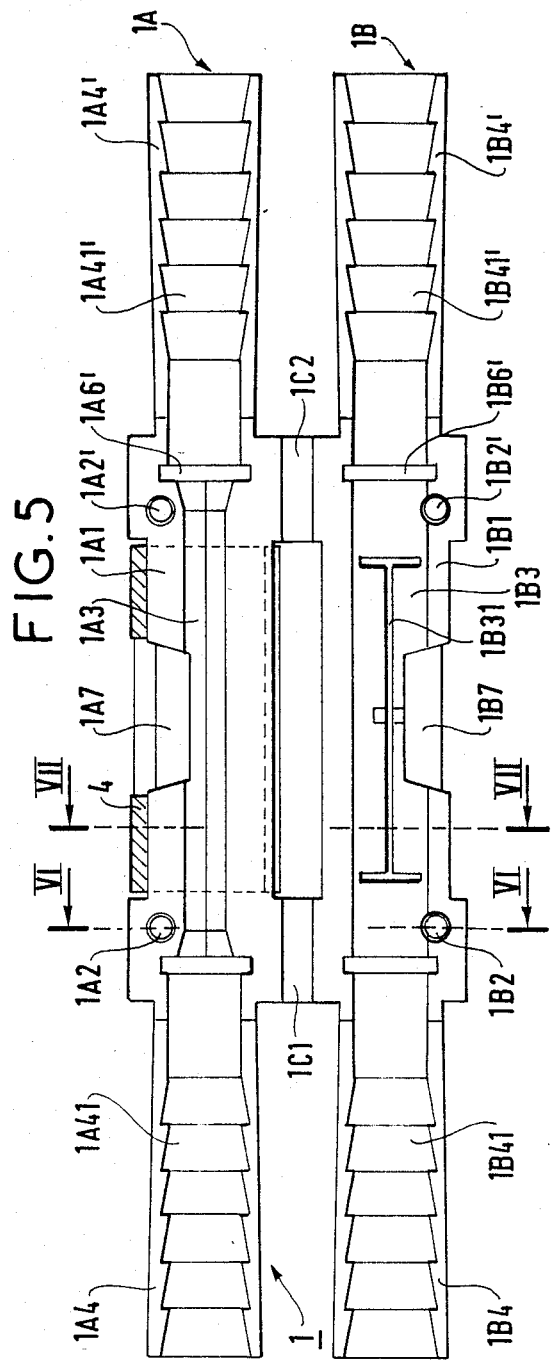
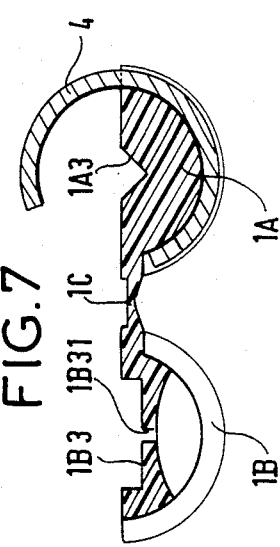
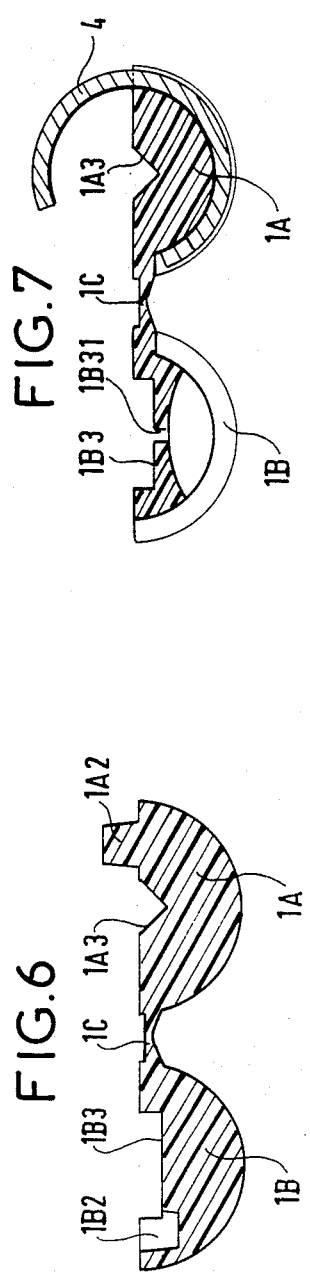

CONNECTOR FOR OPTICAL FIBERS

The present invention relates to a connector for optical fibers.

BACKGROUND OF THE INVENTION

The development of systems implementing optical line transmission means in association with or substituted for electrical line transmission means has led to connectors for optical fibers being made which are based on connectors provided for electric wires.

For reasons paralleling those which already apply to the field of making electrical connections, the manufacturers of connectors for optical fibers seek to provide connection devices which are simpler and cheaper than those presently available, while at the same time improving their reliability and their ease of use.

Simplicity is looked for not only during the manufacture of the component parts and during their assembly, but also when the assembled connector is used by a user.

To this end, the present invention proposes a connector for optical fibers, and more particularly it proposes a connector of the junction block type.

SUMMARY OF THE INVENTION

The present invention provides a connector for optical fibers, the connector comprising two complementary portions each including at least one semi-tubular extension suitable for forming a split tube with the corresponding semi-tubular extension on the other complementary portion with which it is assembled, said tube carrying an external locking ring which surrounds the tube and which, when suitably positioned, serves to urge the semi-tubular extensions towards each other, thereby enabling at least one optical fiber inserted into the tube to be clamped in place, said extensions thickening towards one of the ends of the tube which they form, and said locking ring and at least one of the extensions including respective complementary members constituted by at least one longitudinal groove and at least one longitudinal thickening, thereby enabling the two extensions of the tube to be urged towards each other for clamping an optical fiber by displacing said locking ring towards the end of the tube where the extensions are thicker while said thickening is received in said groove, and then by rotating the locking ring about the tube, thereby dislodging the thickening from the groove and compressing the thickening.

Advantageously, the connector includes at least two split tubes which are aligned and each of which is constituted by two semi-tubular extensions opening out from either side of a central portion which is constituted by pressing together two central zones of the complementary portions, each tube having a corresponding locking ring so as to enable at least two fibers to be interconnected end-to-end in the central portion after being inserted through respective ends of aligned tubes.

BRIEF DESCRIPTION OF THE DRAWINGS

An embodiment of the invention is described by way of example with reference to the accompanying drawings, in which:

FIG. 1 is a plan view of a connector in accordance with the invention and associated with two optical fibers;

FIG. 2 is a longitudinal mid-section through the FIG. 1 connector taken in the plane of the paper;

FIGS. 3 and 4 are respective cross-sections on lines III—III and IV—IV of the connector shown in FIGS. 1 and 2;

FIG. 5 is a plan view of the molded part including the inter-fittable complementary portions for providing the body of a connector in accordance with the invention, with the closure member being shown as well for identification purposes; and FIGS. 6 and 7 are respective cross-sections on lines VI—VI and VII—VII of the assembly shown in FIG. 4.

MORE DETAILED DESCRIPTION

The connector for optical fibers shown in FIG. 1 comprises a body 1 which is molded in rigid plastic material, for example polybutylene terephthalate (PBTP) type material, and including at least one connection duct for receiving two optical fibers 2 and 2' for end-to-end connection, with each fiber being inserted into the duct via a respective end thereof.

Each optical fiber conventionally comprises a core surrounded by a protective covering, with FIG. 2 showing that the fiber 2 comprises a core 2A and covering 2B.

Two preferably identical rings 3 and 3' serve to lock the fibers 2 and 2' in the body 1 of the connector in a manner which is described below.

A closure member 4 is centrally located over the body 1 in order to open and close a window 5 having access to the zone where the cores of the two fibers to be connected meet end-to-end in the central portion of at least one connection duct.

Naturally, it is also possible to provide a connection duct for aligning an optical fiber with a light emitter or a light receiver located in the body 1, in which case only one ring 3 need be provided.

The body 1 is constituted, in this case, by two complementary portions 1A and 1B which interfit with each other in an accurate and predetermined manner. The two portions are recessed in complementary manner so as to delimit at least one fiber connection duct when they are fitted to each other.

In the present embodiment, the complementary portions 1A and 1B constitute respective elongate semi-cylindrical halfshells and together they constitute a connector body assembly of generally cylindrical form about a longitudinal axis XX' which runs along a rectilinear axis of a centrally located connection duct when the asesmbly is in use.

In a variant, connectors having a plurality of connection ducts could be provided by providing parallel and complementary grooving in the facing faces of the complementary portions 1A and 1B when in the assembled position. The two complementary portions may thus include a plurality of connection duct grooves running along the facing faces of each half shell or of a plurality of half shells disposed side-by-side.

In the embodiment shown in FIG. 5, each portion 1A or 1B includes a central zone 1A1 or 1B1 for pressing against the corresponding central zone 1B1 or 1A1 of the other portion in an accurate position which is fixed by reciprocal positioning members distributed on the facing faces of the two complementary portions, such as pegs 1A2 and 1A2' and corresponding sockets 1B2 and 1B2' distributed on the central zones 1A1 and 1B1.

The central portion of the, or each, connection duct is built up from complementary recesses provided in the form of rectilinear grooves extending over the central zones, for example complementary grooves 1A3 and 1B3 provided to extend along the central zones 1A1 and 1B1.

On either side of the inter-fitting central zones, the connection ducts extend inside semi-tubular extensions provided on the complementary portions 1A and 1B in such a manner as to form split tubes when the complementary portions are fitted together, for example there are two split tubes 1A4–1B4 and 1A4′–1B4′ each constituted by a pair of semi-tubular extensions 1A4 and 1B4 or 1A4′ and 1B4′, as the case may be.

The insides of the split tubes are arranged to allow a fiber to be inserted up to the level of the central portion of the connection duct of which they form a part, with the central portion being capable of passing only the core of a previously stripped fiber.

In the present embodiment, each split tube has inside teeth for facilitating the insertion of a fiber and for opposing withdrawal thereof.

This result is obtained by forming a succession of frustoconical notches centered on the axis of the connection duct and provided in part and in complementary locations in the semitubular extensions which constitute each split tube. Thus, when the complementary portions 1A and 1B are fitted together, one such notch 1A41′–1B41′ is provided partially in the semitubular extension 1A4 and partially in the complementary extension 1B4.

In addition, in the embodiment shown, each split tube flares and gets slightly thicker towards its free end through which a fiber may be inserted.

As mentioned above, a fiber is held in place in a split tube by the action of a locking ring coming around the tube.

Each split tube has at least one outwardly directed longitudinal thickening for co-operating with a complementary groove in the locking ring which is placed around the tube. In the embodiment shown, each locking ring has two diametrically opposite internal grooves such as the grooves 31A and 31B of locking ring 3 as shown in FIG. 3. Each split tube also includes two diametrically opposite longitudinal thickenings or integral radially projecting longitudinal ribs which are made on the outside of one of the two semi-tubular extensions of the tube such as the longitudinal thickenings 1A42 and 1B42 on the semi-tubular extensions 1A4 and 1B4.

Each locking ring is guided in translation by its grooves running along the split tube on which it is placed, and rotating the locking ring urges the two semi-tubular extensions towards each other, thus constituting a split tube by virtue of the grooves pressing on the thickening on said extensions.

Naturally, it would be possible to use an alternative arrangement in which external grooves are provided in the extensions and the locking rings are provided with inwardly directed projections or ribs complementary to said grooves.

The insertion of a fiber into a split tube is facilitated by the free end of the tube being flared, in particular when its locking ring is positioned towards the center of the connector in abutment with a circular shoulder which terminates each split tube, e.g. 1A5–1B5 or 1A5′–1B5′. Each of these abutments is constituted by two adjacent cylindrical halfabutments such as 1A5 or 1B5 which are provided on the two complementary portions.

Two sealing rings such as the sealing ring 6 shown in FIG. 2 are placed in two circular grooves situated between the central portion of a connection duct and a respective one of the two split tubes which extend it. Each sealing ring is mounted on the stripped core of a fiber where its covering ends, and the complementary circular groove 1A6′ and 1B6′ in which it is received is made by associating two semi-circular grooves such as 1A6′ and 1B6′ which are provided in the two complementary portions 1A and 1B.

The access window 5 is constituted by two complementary transverse recesses 1A7 and 1B7 (see FIG. 5) provided opposite each other in the central zones of respective ones of the complementary portions, and each opening out firstly to the outside and secondly to the inside at a central position on the connection duct, i.e. in the middle of the rectilinear grooves 1A3 and 1B3 in the zone in which the cores of the two fibers are to meet end-to-end.

The access window 5 may be opened or closed at will by means of a closure member 4 which is placed around the middle of the connector constituted by the complementary portions 1A and 1B when fitted together. This closure member 4 is constituted by a wide and relatively resilient (e.g. made of metal) ring which is longitudinally split (see FIGS. 1 and 4) so as to be able to snap around the complementary portions when fitted together over a zone through which the access window 5 passes, with one of the complementary portions, in this case the portion 1B, being made thinner at this location in order to allow the split ring closure member to be put into place.

In the embodiment shown, the closure member 4 is prevented from moving in transition between the abutments 1A5–1B5 and 1AB′–1B5′ as can be seen in FIG. 1. However, the closure member 4 is free to rotate between these abutments about the assembled complementary portions so that the access window 5 is opened when the longitudinal slot in the ring constituting the closure member is level with the window, and so that the window is closed otherwise.

In a preferred embodiment of the invention as shown in FIG. 5, the body of the connector is constituted by two complementary portions 1A and 1B which are made as a single piece, with the two complementary portions being molded, for example, side-by-side with at least one (and in this case with two) interconnecting hinge portions 1C1 and 1C2 which are sufficiently flexible to fold when the two portions are fitted together.

The central zones 1A1 and 1B1 of the complementary portions 1A and 1B are plane and are provided with complementary rectilinear grooves 1A3 and 1B3 having the same length but different shapes so as to accurately position the cores of the fibers to be interconnected without crushing them.

The rectilinear groove 1A3 is V-shaped in section (see FIGS. 6 and 7) and is provided in a thick portion of the complementary portion 1A so as to provide a relatively rigid connector.

The rectilinear groove 1B3 has a longitudinally split flat bottom so as to be slightly flexible.

The lips of the longitudinal slot 1B31 constitute a rectilinear groove 1B3 which bears longitudinally against the core of each fiber and which thrusts said cores against the V-shaped walls of the rectilinear groove 1A3, thereby centering the fibers (see FIG. 4).

In the embodiment shown, the thickness of the walls on either side of the lips of the longitudinal slot 1B31 tapers off progressively towards the slot as can be seen in FIGS. 4 and 7, thereby firstly providing the desired degree of flexibility and secondly reducing the thickness of the proportion 1B at the place where the closure member is to be fitted, thereby enabling the closure member to be fitted over the assembled complementary portions 1A and 1B by means of its own slot.

A connector in accordance with the invention is simply assembled as follows: firstly the molded part is folded along the or each flexible hinge 1C so as to bring the two complementary portions 1A and 1B together with their central zones 1A1 and 1B1 pressed against each other in a position which is fixed by their complementary positioning members 1A2, 1B2, and 1A2', 1B2'. Then the locking rings 3 and 3' and the closure member 4 are assembled thereon. In the embodiment shown, the complementary positioning members, the locking rings 3 and 3', and the closure member 4 all participate in holding the assembled complementary portions 1A and 1B in position.

Two fibers 2 and 2' are connected by inserting the fibers successively into respective ones of the split tubes 1A4–1B4 and 1A4'–1B4' with the cores of the fibers penetrating into the portion of the connection duct which is formed by the grooves 1A3 and 1B3. To make this possible, the cores are stripped over lengths suitable for ensuring that they meet end-to-end beneath the access window 5, thereby making it possible to verify that the fibers are indeed in end-to-end contact and to glue the cores together, if so required.

The insertion of the fibers 2 and 2' into the split tubes is facilitated by positioning the locking ring 3 and 3' against respective ones of the abutments 1A5–1B5 and 1A5'–1B5', thereby splaying out as far as possible the semi-tubular extensions which constitute these split tubes.

Each of the fibers is locked in place in the connector by moving the corresponding locking rings 3 or 3' towards the free end of the split tube in which it is received and then by rotating the locking ring.

In the embodiment shown, the semi-tubular extensions become slightly thicker towards their free ends, thereby allowing any variation in the size of the fiber coverings to be compensated at their peripheries by the longitudinal position of the locking rings. As mentioned above, partially rotating locking rings after they have been moved in translation serves to compress the thickenings on the semi-tubular extensions on which they are mounted by ejecting the thickenings from the corresponding grooves as the rings are turned through at least one-half turn. For example, the thickenings 1A42 and 1B42 are moved out from the grooves 31A and 31B when the ring 3 is rotated about the semi-tubular extensions 1A4 and 1B4.

An external mark (not shown) can be provided, if necessary, in order to indicate the degree to which the rings have been rotated.

The closure member 4 is normally operated after a connection has been established in order to close the access window 5.

Naturally, it is possible in variant embodiments to provide different shapes of rectilinear grooves 1A3 and 1B3, for example they could both be V-shaped, or semi-circular. The ducts may be made using a different number of semi-tubular extensions. A different type of closure member 4 could be used, for example a member suitable for sliding longitudinally.

We claim:

1. A connector for connecting optical fibers end to end, said connector comprising a body having two complementary portions each including at least one semi-tubular extension for forming a split tube with the corresponding semi-tubular extension on the other complementary portion with which it is assembled, said tube carrying an external locking ring which surrounds the tube and which, when suitably positioned, urges the semi-tubular extensions towards each other, thereby enabling at least one optical fiber inserted into the tube to be clamped in place, said extensions radially thickening towards one of the ends of the tube which they form, said locking ring being disposed about said one end of said extension and at least one of the extensions including respective complementary members constituted by at least one longitudinal groove and at least one longitudinal radially projecting rib whereby the two extensions of the tube are urged towards each other for clamping an optical fiber by axial displacement of said locking ring towards the end of the tube where the extensions are thicker said rib being received in said groove, and by rotating the locking ring about the tube, thereby circumferentially shifting the rib relative to the groove to radially compress the rib and force the semi-tubular extensions towards each other and about the optical fiber therebetween.

2. A connector for optical fibers according to claim 1, wherein said split tubes are two in number and are aligned and each tube is constituted by two semi-tubular extensions opening out from either side of a central portion which is pressed together at two central zones of the complementary portions, each tube having a corresponding locking ring to interconnect two fibers end-to-end inserted through respective ends of aligned tubes.

3. A connector for optical fibers according to claim 2, including at least one internal connection duct for connecting the fibers, said connection duct being constituted by complementary grooves provided in said complementary portions along the semi-tubular extensions of the aligned tubes and across the central zone.

4. A connector for optical fibers according to claim 3, wherein the central zones of the complementary portions have complementary recesses extending transversely to the connection duct grooves, with the second duct formed by the transverse recesses opening to the outside of the connector formed by the assembled complementary portions and constituting an access window in the middle of the connection duct where the two cores of the fibers to be connected meet.

5. A connector for optical fibers according to claim 4, further including a closure member fastened around the assembled complementary portions in the vicinity of the access window and movably mounted for movement over the assembled complementary portions between two limit positions in such a manner as to open and to close the access window.

6. A connector for optical fibers according to claim 5, wherein the closure member is constituted by a longitudinally split ring resiliently snap-fitted around the connector for rotation through at least a portion of turn about the connector formed by the assembled complementary portions, such that the closure member opens and closes the access window depending on the angular position of the closure member about the connector, while simultaneously resiliently maintaining the complementary portions in the assembled position.

7. A connector for optical fibers according to claim 1, wherein said two complementary portions are molded side-by-side, as single piece portions interconnected by at least one flexible side connection capable of folding to allow the portions to be assembled.

8. A connector for optical fibers according to claim 2, wherein the two central zones bearing positioning members and grooved in complementary manner and which delimit the central portion of at least one connection duct on respective ones of the complementary portions, are rectilinear and are provided with grooves of the same length, one of the grooves being rigid and V-shaped in section, and the other having a slightly flexible bottom so as to provide accurate positioning without crushing of the cores of the fibers to be connected.

9. A connector for optical fibers according to claim 8, including at least one groove having a slightly flexible bottom, said bottom being longitudinally and centrally split, and having a wall of a thickness for the complementary portion which includes said groove, tapering transversely towards the longitudinal edges of the slot.

* * * * *